US008872924B1

(12) United States Patent  
Lin et al.

(10) Patent No.: US 8,872,924 B1  
(45) Date of Patent: Oct. 28, 2014

(54) IMAGING BASED AUTO DISPLAY GRID CONFIGURATION SYSTEM AND METHOD

(71) Applicant: ATI Technologies ULC, Markham (CA)

(72) Inventors: Ting-Yu Lin, Markham (CA); Wayne C. Louie, Port Perry (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 13/909,154

(22) Filed: Jun. 4, 2013

(51) Int. Cl.
*H04N 17/00* (2006.01)
*H04N 5/66* (2006.01)
*H04N 17/04* (2006.01)

(52) U.S. Cl.
CPC .................................. *H04N 17/04* (2013.01)
USPC ............................ 348/189; 348/181; 348/383

(58) Field of Classification Search
USPC ......... 348/180, 181, 182, 184, 187, 188, 189, 348/191, 383; 345/1.1, 1.3, 690
IPC ............................ H04N 17/00,17/02, 9/12, 5/66
See application file for complete search history.

(56) References Cited

U.S. PATENT DOCUMENTS

| | | | |
|---|---|---|---|
| 5,638,461 A * | 6/1997 | Fridge | 348/190 |
| 7,742,011 B2 | 6/2010 | Damera-Venkata et al. | |
| 8,264,547 B1 * | 9/2012 | Sayre et al. | 348/189 |
| 2005/0185920 A1 | 8/2005 | Harper et al. | |
| 2006/0001593 A1 | 1/2006 | Baudisch | |
| 2008/0285087 A1 * | 11/2008 | Perkins et al. | 348/383 |
| 2009/0096711 A1 | 4/2009 | Jang et al. | |
| 2010/0033402 A1 | 2/2010 | Yoshida et al. | |

OTHER PUBLICATIONS

International Search Report and Written Opinion from Canadian Intellectual Property Office; International Application No. PCT/CA2011/000012; dated May 2, 2011.

* cited by examiner

*Primary Examiner* — Sherrie Hsia
(74) *Attorney, Agent, or Firm* — Faegre Baker Daniels LLP

(57) ABSTRACT

An apparatus and method provides an automated mechanism for configuring a position arrangement of displays in a group of displays, such as a display grid. The apparatus and method uses an image capture unit, such as a camera to capture an image of the entire display grid while test patterns are being provided. In one example, a first device outputs the test patterns to the display grid while a second device that includes the camera analyzes the captured images and determines whether a display in the display grid needs to be logically remapped to provide proper image display when the first device outputs full SLS frames in normal operation.

18 Claims, 13 Drawing Sheets

IMAGING BASED AUTO DISPLAY GRID CONFIGURATION SYSTEM AND METHOD

FIELD OF THE DISCLOSURE

The disclosure relates generally to methods and apparatuses for configuring a plurality of displays such as display grids that display a single large viewing surface.

BACKGROUND OF THE DISCLOSURE

Display grids, also known as video walls, are used in the digital signage market, with gaming applications, flight simulation systems and for other purposes. The physical configuration includes typically, a matrix of displays (or monitors) arranged in rows and columns, single rows, or any other configuration. A display system generates the image frames such that a single large surface (SLS) is shown across the display grid. Such systems usually require manual input for the configuration of the display grid. Configuration data includes the number of displays in grid, width and height of the overall grid, the location of each display in the grid and viewport position of each display (i.e., the viewport that is showing on the display) for example. For n number of displays in the grid, the user needs to input the per display data (n−1) times. For a display grid that contains 24 or more displays, manual configuration can quickly become a tedious task, prone to human errors.

Automated approaches are also known that require the use of customized displays that include optical sensors or proximity sensors positioned for example on all four sides of each display. When the customized displays are activated the sensors can communicate with each other and indicate each display's respective position within the matrix or grid. However such systems can be costly because they require customized displays that each requires their own sensors to provide sensing capability. Off the shelf displays cannot be used.

An improved multi-display position arrangement configuring apparatus and method is desired.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
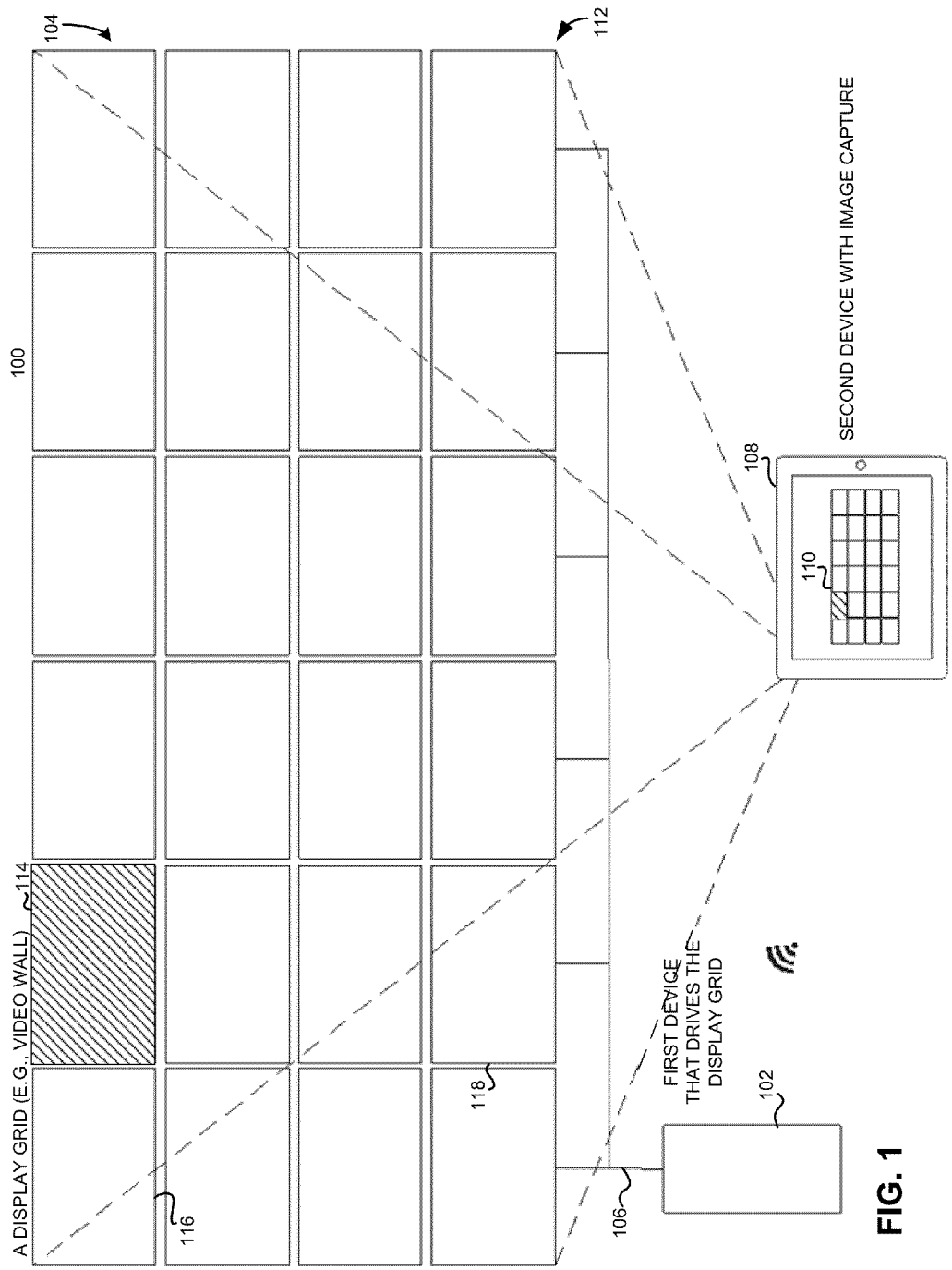
FIG. 1 is a diagram illustrating one example of a system in accordance with one example set forth in the disclosure.

Briefly, an apparatus and method provides an automated mechanism for configuring a position arrangement of displays in a group of displays, such as a display grid. The apparatus and method uses an image capture unit, such as a camera to capture an image of the entire display grid while test patterns are being provided. In one example, a first device outputs the test patterns to the display grid while a second device that includes the camera analyzes the captured image of the test pattern and determines whether a display in the display grid needs to be logically remapped to provide proper image display when the first device outputs full SLS frames in normal operation. If desired, a single device may be employed.

In one example, the method and apparatus provides a test pattern for at least one of the displays in the group of displays. The image of the entire group of displays is captured using an image capture unit, such as a camera while the test patterns are provided. The apparatus (e.g., system) logically remaps the one display that is provided test pattern if the captured test image of the group of displays is determined to indicate a disparity in position arrangement based on the test pattern.

In another example, a method and apparatus provides a bezel compensation test pattern to a plurality of the displays in the group. An image capture unit is controlled to capture the image of the group of displays in response to providing the bezel compensation test image (e.g., while the test patterns are provided). The method and apparatus provides automatic bezel compensation of display information output to a plurality of displays, in response to the captured bezel compensation test image. Using a remote (or local) image capture device to capture the image of the display grid while test images for bezel compensation and display location configuration purposes are provided, allows automation of bezel compensation and display grid configuration to occur. Image recognition techniques are employed to determine whether the test image on a particular display corresponds with an expected image. For bezel compensation, bezel compensation test patterns are used to automatically determine the spacing between displays so that compensation for bezel thicknesses and space between monitors can be automatically provided when displaying the SLS images on the group of displays.

In one example, an apparatus and method determines whether to logically remap the particular display based on the captured image of the group of displays when the test images are presented, and based on expected test pattern information. In one example, providing the test pattern for at least one of the displays in the group of displays includes sequentially providing the test pattern on each display of the group of displays. Capturing the image of group of displays using the image capture unit includes capturing the image of the group of displays for each sequentially provided test pattern.

In another example, a method and apparatus provides a user interface for adjusting the capturing accuracy the group of displays. The method and apparatus may also display one or more frames of images on the group of displays after logically remapping the one or more displays. In another example, a method and apparatus captures an image of the group of displays, such as by an image capture unit. A total dimension of a display grid formed by the group of monitors is determined, such as by control logic, based on the captured image of the group of displays. The control logic requests expected test pattern information (expected grid information) from another device that provides the test pattern and compares the expected test pattern information to the captured test image of the group of displays. The expected information may also be pulled by the image capture device or prestored therein. The method and apparatus also determines whether a logical remapping of at least one of the displays is required based on the comparing operation. The control logic may notify the device that provides images on the display grid, that a logical remapping is required and provide the remapping details to correct the display grid in manner to provide SLS frame information correctly on the display grid. However, any suitable device may determine which display needs logical remapping.

In one example, a first device that drives the display grid and a second device that includes an image capture unit communicate wirelessly with each other to facilitate automatic display grid configuration operation. The second device receives and analyzes the video stream from the image capture unit (e.g., camera) in real-time. The first unit sends commands for example to a display driver executing on a graphics card(s) and controls output to the display grid. The wireless channel is established between the first and second devices over which data can be transmitted. When the configuration process starts, the user points the second device with the image capture unit at the display grid. When the entire grid is in view, the second device instructs the first device to display the test patterns on the display grid. The second device detects the captured test image from the input video stream. By comparing the relative size of each display in the grid to total grid size, the second device determines the width and height of the grid. The test pattern lights up one display at a time for the entire list of displays in grid. By identifying the display that is lit up, the second device can detect that a display is out of order. If the lit display is incorrectly placed, its viewport settings are swapped by the first device with the display that is in the correct location. The second device, or any other device, can perform the exchange sort algorithm on all the displays in grid. Once the test pattern is finished, the second device sends the temporary configuration changes of the display grid to the first device. The first device applies the temporary connected configuration on the display grid and waits for the user's approval. In one example, once the display positions are in correct order and the user has confirmed the configuration, the second device proceeds to perform finer adjustments such as bezel compensation.

The disclosed operation is scalable to handle increasing sizes of display grids and can be applied to graphics hardware with little or no modification. No special equipment is required and can be implemented using smart phone, tablet platform or other devices that employ an image capture unit, such as camera. The method and apparatus provides a user-friendly low complexity configuration process that can increase the accuracy and speed up the configuration process by improving user arrangement decisions, allowing use of conventional display devices and provide bezel compensation, if desired, as well.

FIG. 1 illustrates one example of an apparatus 100 for configuring a position arrangement of displays in the group of displays. As shown, the apparatus 100, also referred to as a system, includes a first device 102 that drives a display grid 104 through known communication links 106. The first device may be a desktop computer or any other suitable device and in this example includes one or more graphics cards configured to drive each of the displays in the display grid, as known in the art. A second device 108, in this example, is a portable tablet device that is in wireless communication with the first device 102. The second device 108 includes a camera or other image capture unit and outputs a video stream containing captured images of the entire display grid. The second device 108 may be any suitable device such as a smart phone, laptop or any other suitable device. The captured image is shown as captured image 110. It will be recognized that although the apparatus 100 is described in connection with using two devices, that the first device 102 may include an image capture unit such as a wireless camera, wired camera or other suitable image capture device that may be positioned to capture the image of the display grid as well so that a single device is employed.

Figure 2:
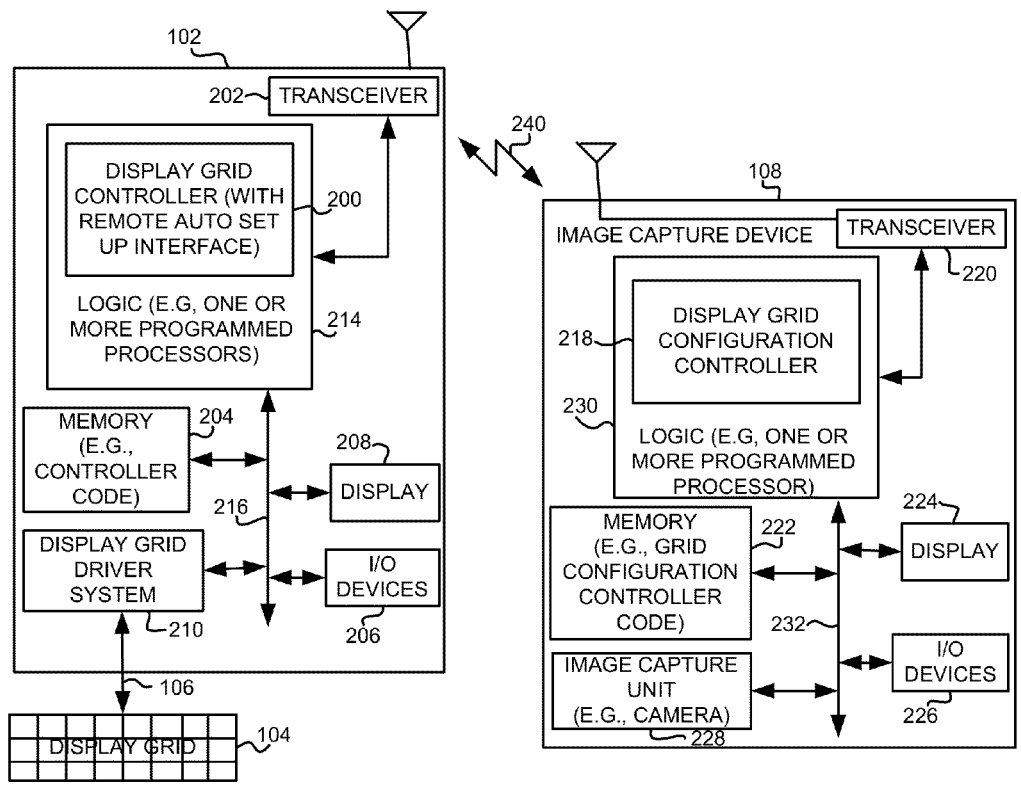
FIG. 2 illustrates an example of a system in accordance with one example set forth in the disclosure.

Referring also to FIG. 2, the device 102 includes display grid controller 200 which may be control logic such as one or more programmed processors (e.g., CPU), discrete logic including state machines, FPGAs, or any suitable combination of hardware and software. The device 102 also includes a wireless transceiver 202, memory 204, I/O devices 206, display 208 and a display grid driver system 210 (e.g., GPU) that is in operative communication with the display grid controller 200, shown to be implemented as one or more programmed processors 214 in this example. The components are interconnected through various communication links 216 as known in the art.

Device 108 includes a display grid configuration controller 218 which may be implemented as any suitable logic including one or more programmed processors, discrete logic such a state machines, or any suitable combination of hardware and software. Device 108 also includes a wireless transceiver 220, memory 222, display 224, I/O devices 226 and image capture unit 228 that are in operative communication to one or more processors 230 using known communication links 232.

The memory 204 and 222 may be any suitable memory such as RAM, ROM or any suitable non-transitory storage medium that stores executable instructions that when executed by one or more processors 214 and 230 causes the one or more processors to operate as described herein. The display grid driver system 210 as known in the art provides image data that is displayed on each of the displays in the display grid 104.

The display grid controller 200 provides a test pattern in this example for display 114. The display grid configuration controller 218 communicates with the display grid controller 200 via a wireless communication link 240 in this example.

The display grid configuration controller 218 controls capture of an image (test image) of the entire display grid 104 using an image capture unit 228 in response to the display grid controller 200 providing the test pattern. The display grid controller 200 logically remaps for example display 114 to a logical position within the display grid 104 if it is determined by the display grid configuration controller 218 that there is a disparity in position arrangement, based on the test pattern. For example, the device 102 may either store or obtain an expected test pattern image and compare the expected test pattern of the display grid 104 with the actual captured image of the display grid 104 presenting the test pattern and determine that the captured test image 112 (generated based on the outputting the test pattern) does not match the expected test pattern. Therefore when the wrong display lights up, device 108 determines the disparity and determines a proper location based on the expected test pattern information. It will also be recognized that many of the devices may make the determination as to whether or not there's a disparity and determining appropriate remap location. Known image analysis systems perform difference of image analysis such as systems that employ ImageMagick v6, findimagedupes software programs or any suitable systems. Also a pixel by pixel comparison can be performed with a setting for tolerance of discrepancy. If the tolerance is exceeded when comparing the two images than the two images are considered different. This process can be performed by a GPU for example.

Figure 3:
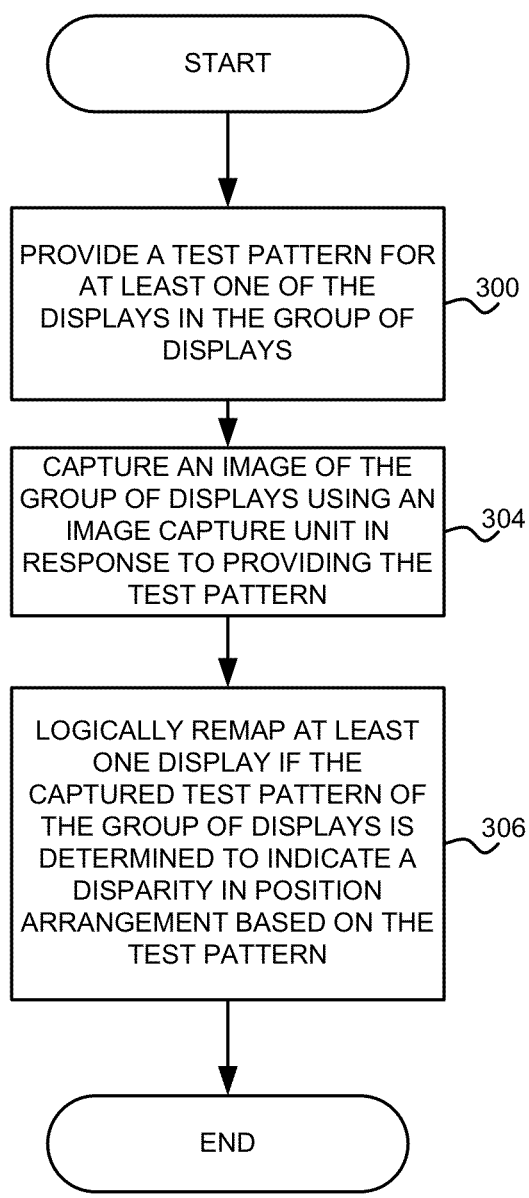
FIG. 3 is a flowchart illustrating one example of a method for configuring a position arrangement of a display in a group of displays in accordance with one example set forth in the disclosure.

Referring also to FIG. 3, in operation, one example method of operation of the apparatus 100 includes the first unit 102 providing a test pattern for at least one of the displays 114 in the group of displays 104. This is shown in block 300. It will also be recognized that each of the operations described in this disclosure may be carried out by any suitable device and in any suitable order.

As shown in block 304, the method includes capturing, for example by device 108, an image 112 of the group of displays using an image capture unit, such as camera, in response to providing the test pattern shown to be a hashed pattern on display 114. As shown in block 306, the method includes logically remapping the at least one display if the captured test image of the group of displays is determined to indicate a disparity in position arrangement based on the expected location of the test pattern. The logical remapping may be done for example by any device, but in this example, device 108 provides remapping information to the device 102.

Figure 4:
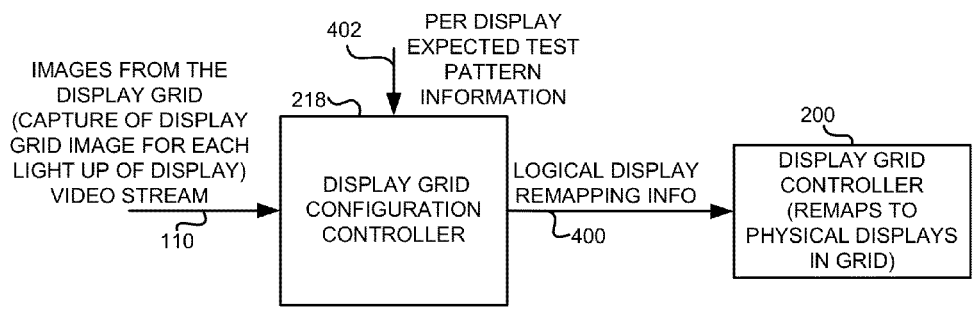
FIG. 4 is a block diagram illustrating one example of an apparatus for configuring the arrangement of displays in a group of displays in accordance with one examples set forth in the disclosure.
Figure 5:
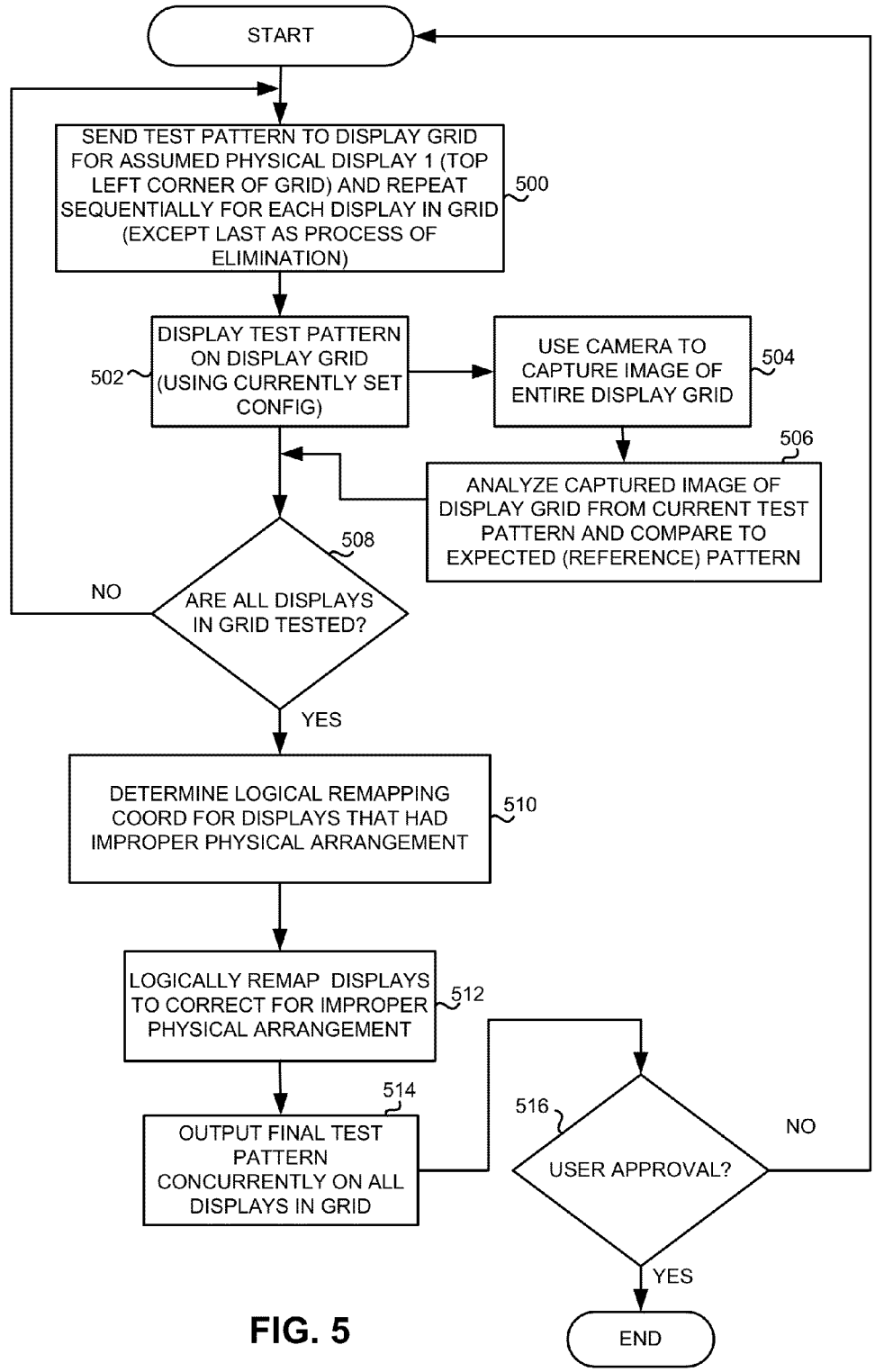
FIG. 5 is a flowchart illustrating one example of a method for configuring a position arrangement of a display in a group of displays in accordance one example set forth in the disclosure.

Referring to FIGS. 4 and 5, one example the operation of the display configuration controller 218 and the display grid controller 200 will be described. As shown in block 500, the method includes sending a test pattern to the display grid 104 on a first display such as display 116 (FIG. 1) which is shown as the top left corner of the grid. The test pattern may be any suitable pattern such as a colored screen, a graphics image or any other display information. This may be done for example by the display grid controller 200 or the display grid driver system. As shown block 502, the method includes displaying the test pattern on a display such as at location 116 and as shown in block 504 and using the image capture unit 218 to capture the test image 112 of the entire display grid.

As shown in block 506, the method includes analyzing the captured image (e.g., a video stream generated by the camera) of the display grid which includes the current test pattern and comparing the image to expected test pattern information (an expected grid image that serves as a reference grid image). The expected test pattern information may be provided to the display grid configuration controller 218 by the display grid controller 200 or may be stored in memory or obtained from any suitable location or source.

As shown in block 508, the method includes determining if all of the displays in the display grid have been tested. If not, the process repeats to block 500 where the next display in the display grid is provided with a test pattern. The process continues until all displays in the display grid have been provided with a test pattern. As shown in block 510, the method includes determining logical remapping coordinates for displays that have improper physical arrangements as determined for example by the comparing of each display test patterns to an expected reference display grid pattern by the display grid configuration controller 218.

For example, if display 112 output is supposed to be located at display location 118, a logical remapping coordinate would indicate for the display grid controller 200 to logically remap the output pixels for display 112 to the display 118. This information is also shown as logical display remapping information 400 and is provided to the display grid controller 200 as shown in block 512. The display grid controller 200 logically remaps the displays to correct for the improper physical arrangement using the remapping information 400. As shown in block 514, a temporary final test image is generated by the display grid controller 200 for display on the display grid 104 by the display grid driver system 210 so that a test pattern occurs concurrently and all displays in the grid. A user is prompted through a graphic user interface or other user interface as shown in block 516 to obtain user approval. If the user does not approve, the process can be repeated. If the user approves, the display grid is properly configured and display information is output to the display grid during normal operation.

Accordingly as set forth above, the display grid configuration controller 218 in one example, determines whether to logically remap a display based on the captured image of the group of displays with the provided test pattern therein and based on expected test pattern information. The display grid controller 200 provides the test pattern for a display and other displays in the group sequentially (e.g., one at a time). The display grid configuration controller 218 controls the capturing of the image of the group of displays using an image capture unit 228 to capture the test image. The image capture unit 228 can be left on continuously to capture sequential display images and the display grid configuration controller 218 can continuously compare the expected pattern to a received pattern from capturing unit 228.

Figure 6:
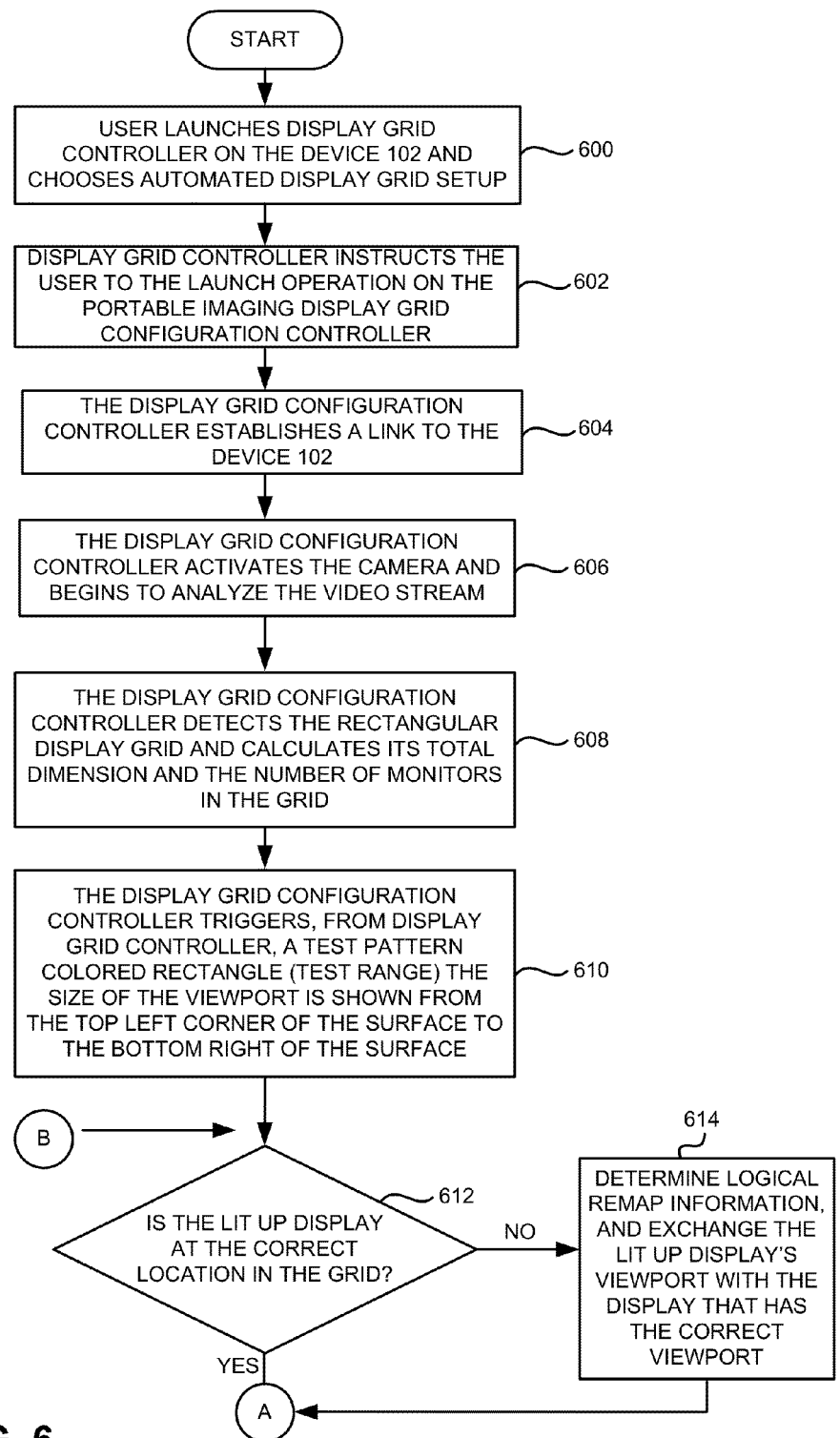
FIG. 6 is a flowchart illustrating one example of a method for configuring a position arrangement of a display in a group of displays in accordance one example set forth in the disclosure.
Figure 7:
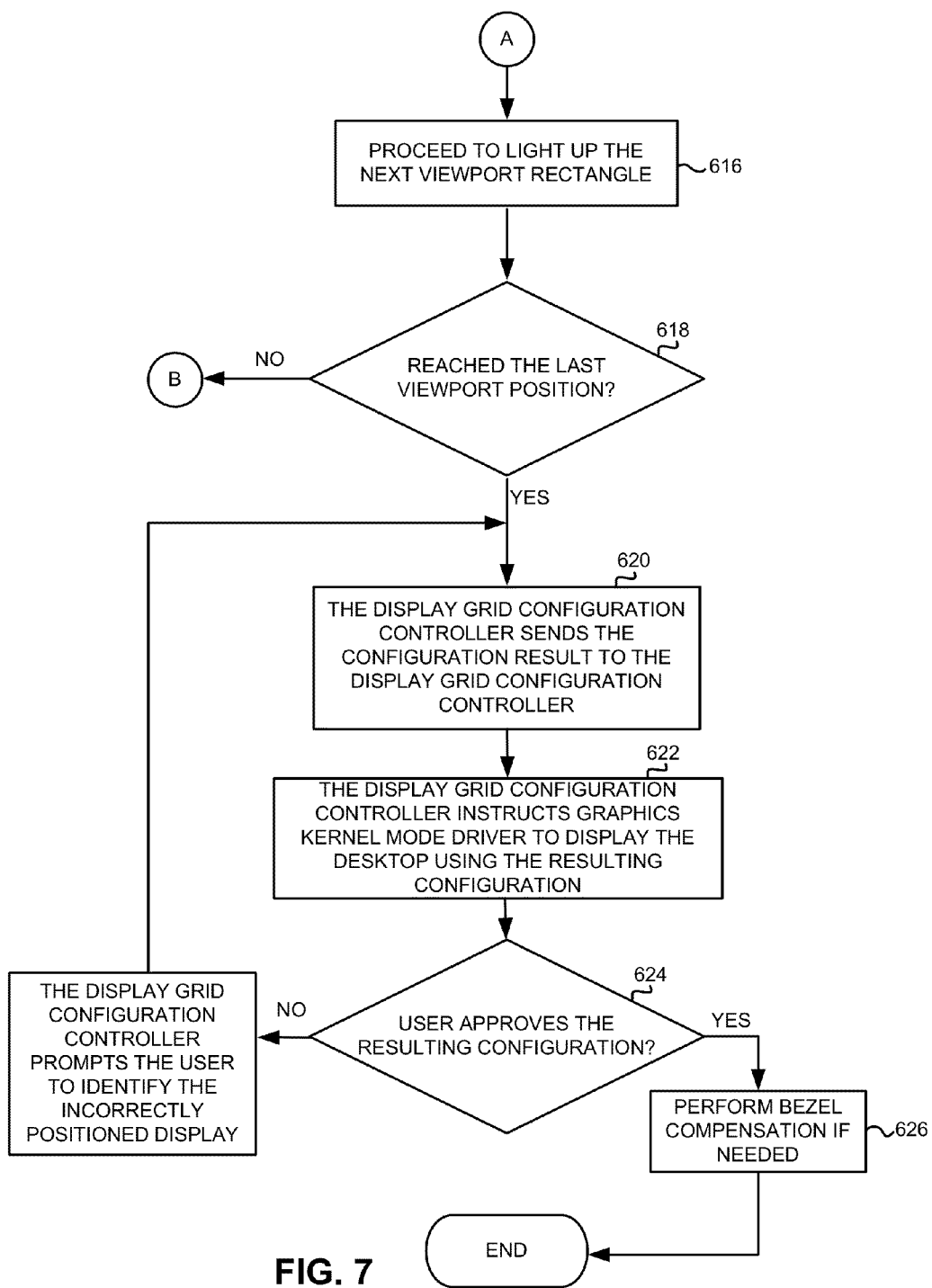
FIG. 7 is a flowchart illustrating one example of a method for configuring a position arrangement of a display in a group of displays in accordance one example set forth in the disclosure.
Figure 8:
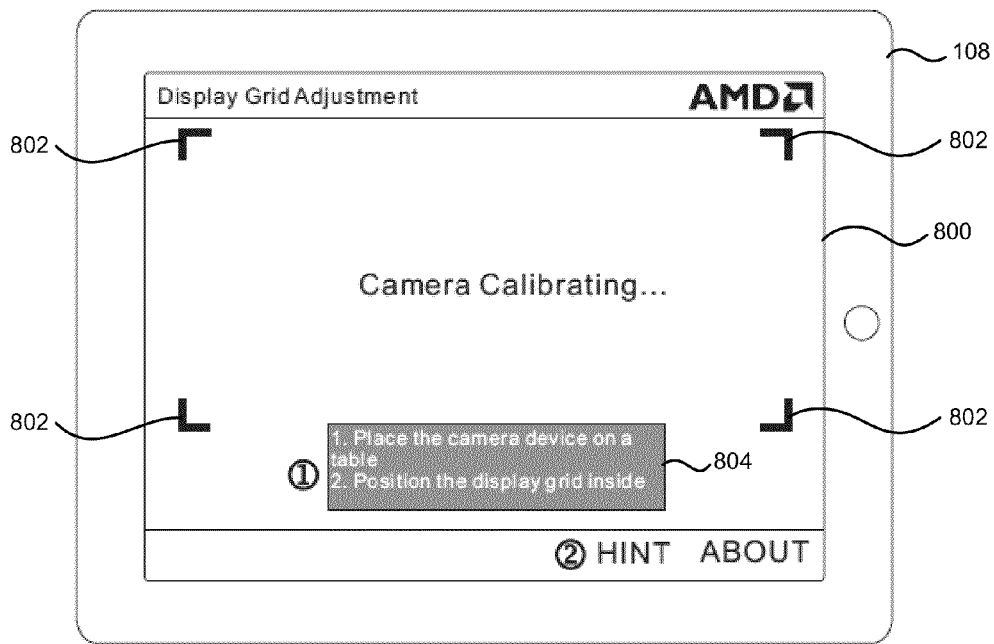
FIG. 8 is a diagram illustrating one example of a graphic user interface in accordance with one example set forth in the disclosure.

FIGS. 6 and 7 illustrate in more detail a method for providing configuration of a position arrangement for a group of displays. In one example, the display grid controller 200 can be implemented as a processor executing code stored in memory 204 such as for example a CPU or other suitable processor 214. Similarly the display grid configuration controller 218 may be provided by processor 230 by executing executable instructions stored in memory 222 on device 108. In this example, shown in block 600 a user launches the display grid controller 200 by activating a user interface and choosing an automated display grid set up operation. As shown in block 602, the method includes the display grid controller 200 presenting a graphic user interface to the user asking the user to launch operation of the portable imaging device 108. As shown in block 604, the method includes the display grid configuration controller 218 establishing a wireless link to the device 102. As shown in block 606 the method includes the display grid configuration controller 218 activating the camera and beginning to analyze the video stream from the camera. As shown in block 608, the method includes the display grid configuration controller 218 detecting a singular display grid and tabulating the rectangular display grids total dimension and the number of monitors in the grid. This is done by: lighting up one display; storing (remembering) the size of the lit up display; lighting up all the displays; comparing the total lit up area to the one lit up display; using a ratio, the system can calculate the dimension and the total number of monitors in the grid (i.e. 24 displays in 4 by 6 grid).

As shown in block 610, the display grid configuration controller 218 issues a display test pattern request to display a test pattern on each of the displays of the group. This is sent to the device 102. In response, the display controller 200 provides a display test pattern to one of the displays in response to the received display test pattern request. As shown in block 612, the display grid configuration controller 218 determines if the display that is lit up (e.g., has the pattern thereon) is in the correct location in the grid. If the lit up display does not have the correct location based on expected location, as shown in block 614, the method includes generating remap information 400 indicating the proper location for display information for the current display being tested. In other words the viewport for the current display that is being tested is changed to the correct viewport location in the display grid which can be provided to the display for controller 200.

As shown in block 616, the method includes proceeding to provide the next test pattern (e.g., light up the next display) namely the next viewport rectangle. As shown in block 618 the method includes determining if the last viewport position of the display in the grid has been reached, if not the process returns to block 612. However if the last display has been tested, the method includes the display grid configuration controller 218 sending the configuration results, namely the logical display remapping information 400 to the display grid controller 200. This is shown in block 620. This logical display remapping information 400 may be wirelessly received by device 102 from the external image capture device 108. The image capture unit 228 is external in this example and is on another device. As shown in block 622, the method includes logically remapping positions of displays using the received remapping information 400. In block 624 the method includes presenting a user interface to allow the user to approve the resulting configuration. If the user approves, then the method may end resulting in displaying of one or more frames of images on the grid that has been properly compensated. If desired, bezel compensation operation may also be performed as shown in block 626.

Referring to FIGS. 8-12, examples of graphic user interfaces are provided to illustrate one example of the operation by the device 108. The processor 230 may present the graphic user interface 800 which includes display grid markers 802 inside which the display grid is to be positioned. The user may be informed that the camera is calibrating meaning that it is setting up communication link with device and will begin the process of automatic display grid adjustment. Instruction information 804 may also be provided if desired. It will be recognized however that these are simply examples and that any suitable interface to effect operation may be employed desired.

Figure 9:
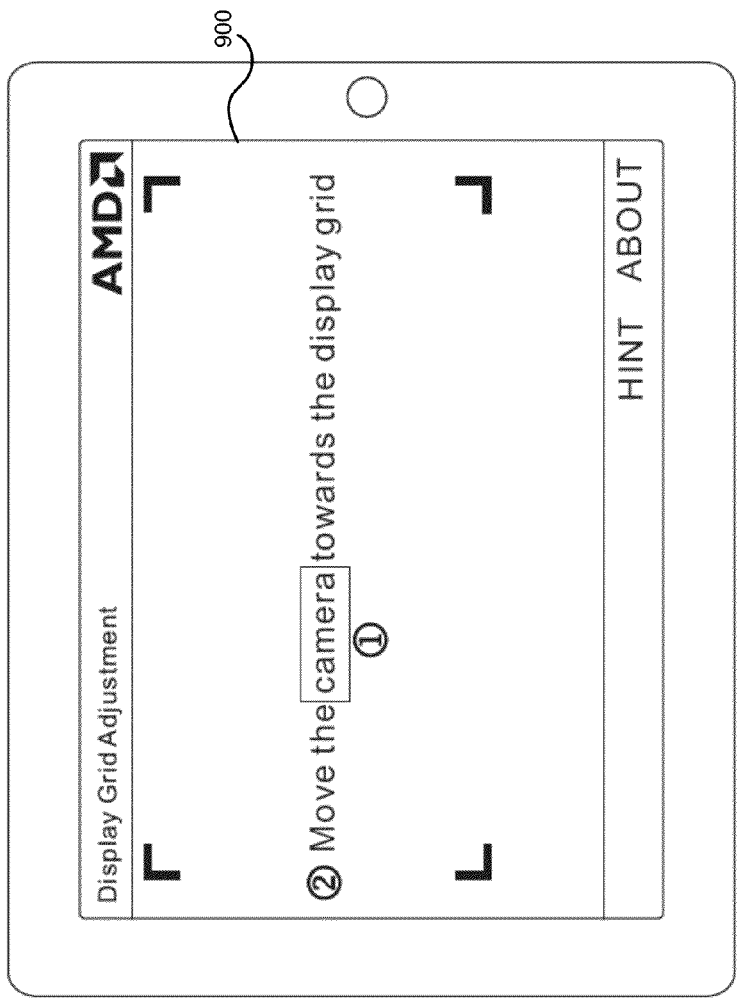
FIG. 9 is a diagram illustrating one example of a graphic user interface in accordance with one example set forth in the disclosure.
Figure 10:
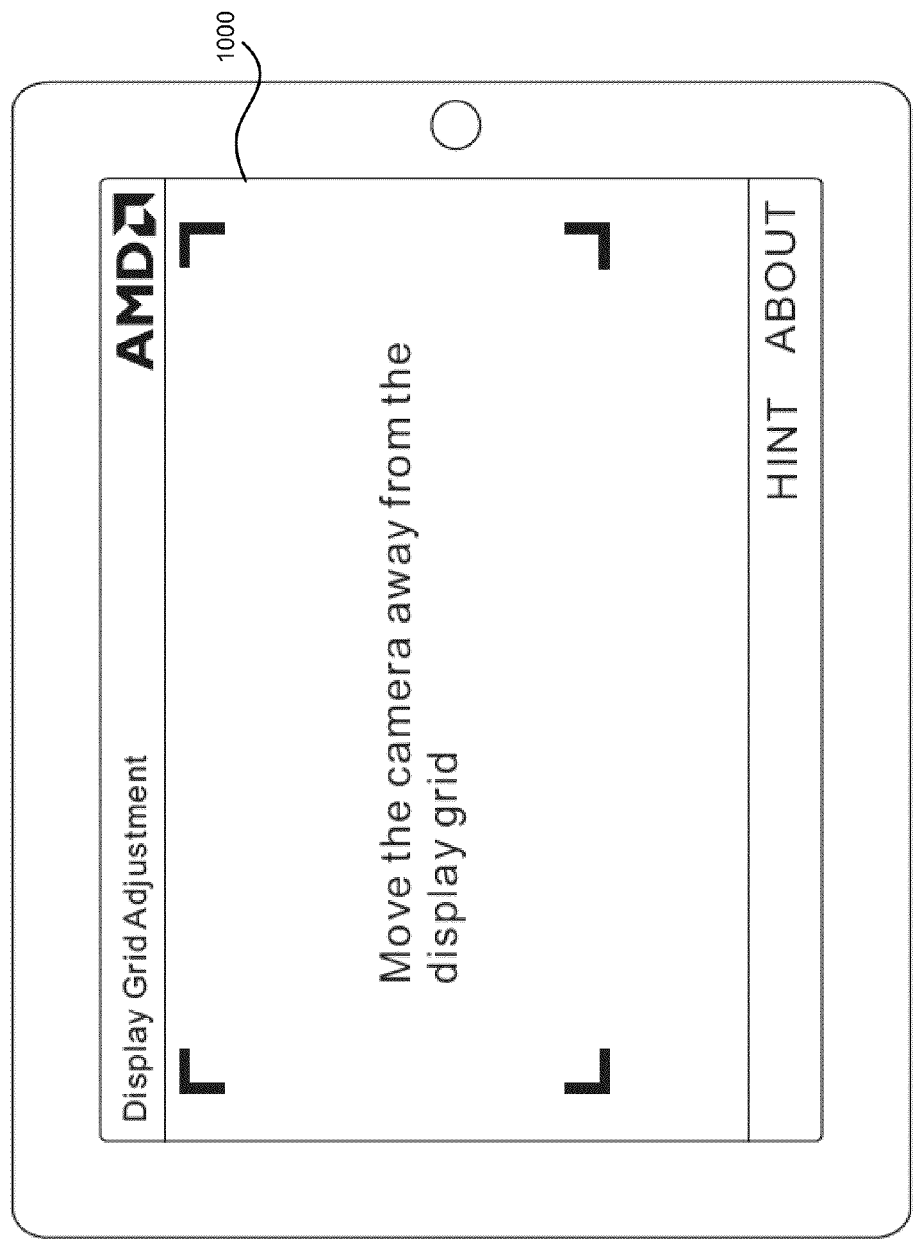
FIG. 10 is a diagram illustrating one example of a graphic user interface in accordance with one example set forth in the disclosure.
Figure 11:
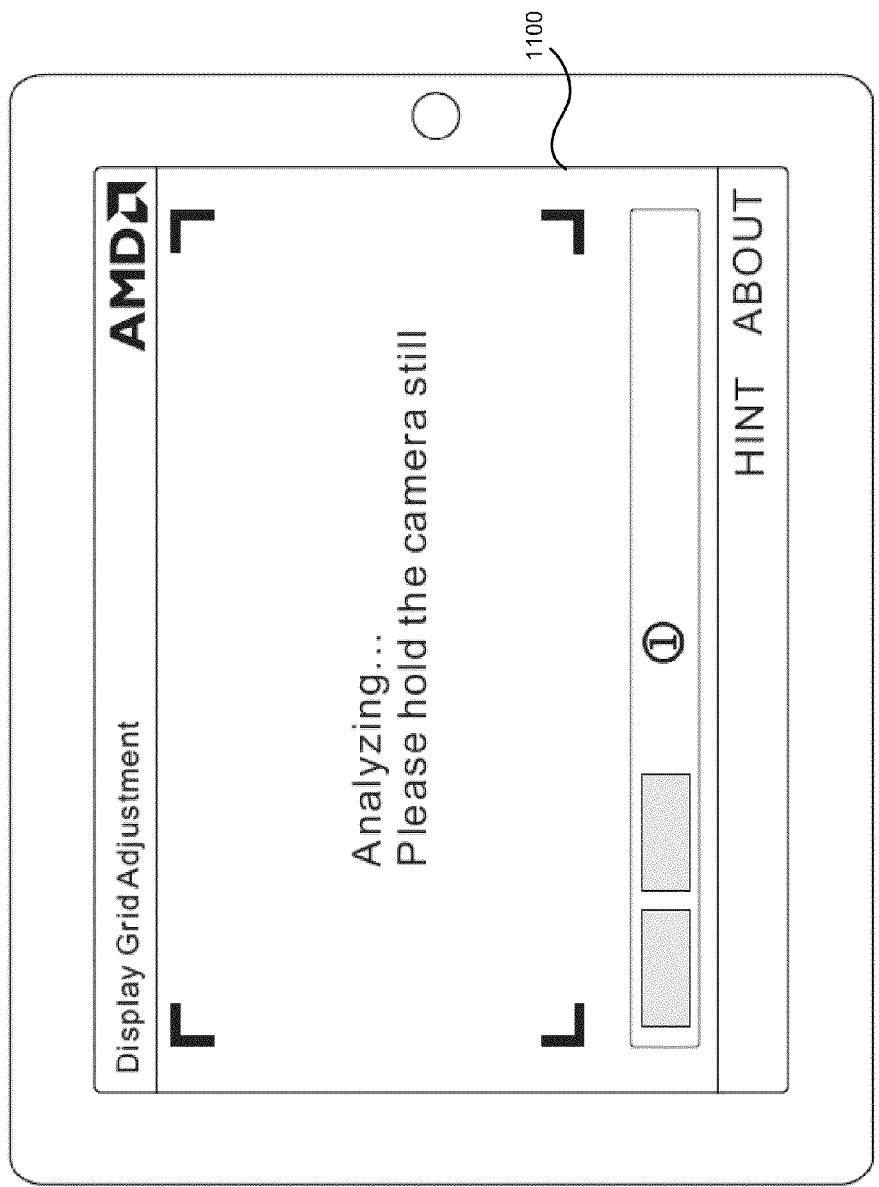
FIG. 11 is a diagram illustrating one example of a graphic user interface in accordance with one example set forth in the disclosure.
Figure 12:
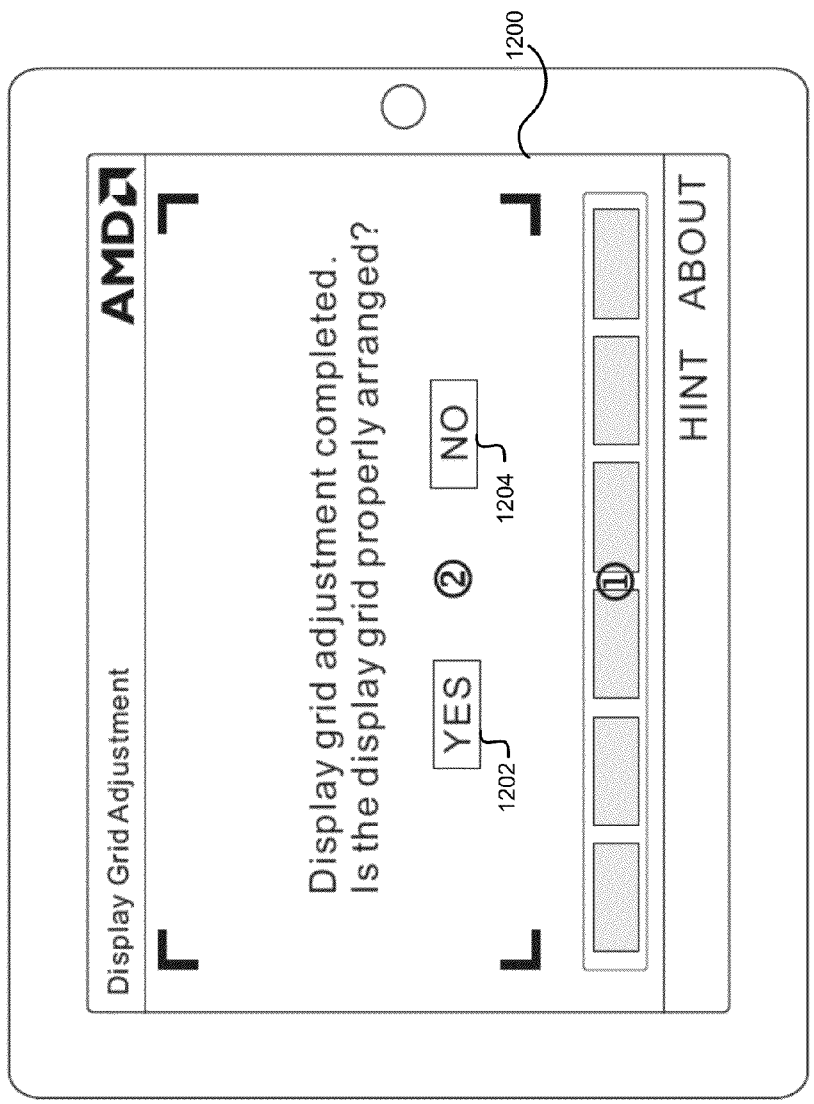
FIG. 12 is a diagram illustrating one example of a graphic user interface in accordance with one example set forth in the disclosure.

As shown in FIG. 9, the display grid configuration controller 218 analyzes the image information from image capture unit 218 to determine whether the display grid is within the markers 802 and informs the user if the user needs to move the camera toward the display grid as shown by graphic interface 900. Similarly, as shown in FIG. 10, a graphic user-interface 1000 may be used to indicate to the user that the camera focus need shifting away from a display grid since the camera focus is too close to the display grid. As shown in FIG. 11, a graphic user-interface 1100 can inform the user that the analysis is taking place. As shown in FIG. 12, a graphic user-interface 1200 can be provided with selectable buttons 1202 and 1204 asking the user to confirm that the display grid adjustment has been completed.

Figure 13:
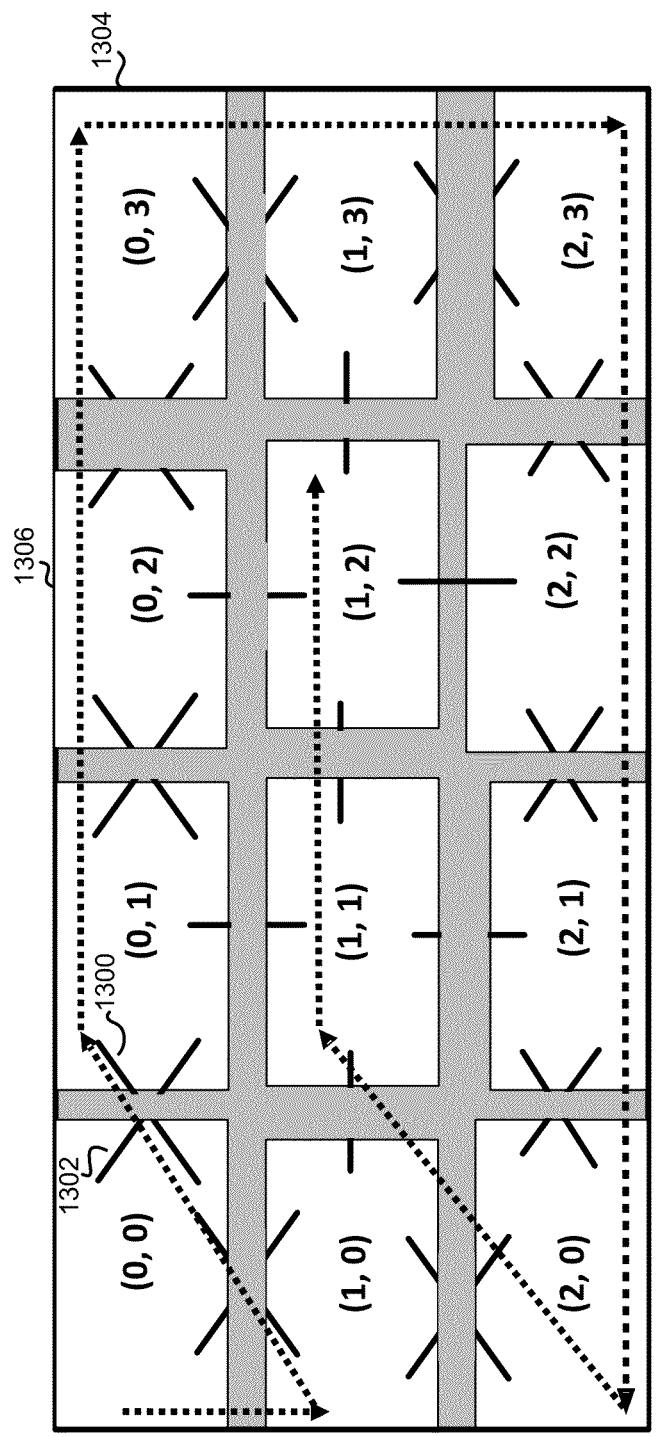
FIG. 13 illustrates one example of a bezel correction technique in accordance with one example set forth in the disclosure.
Figure 14:
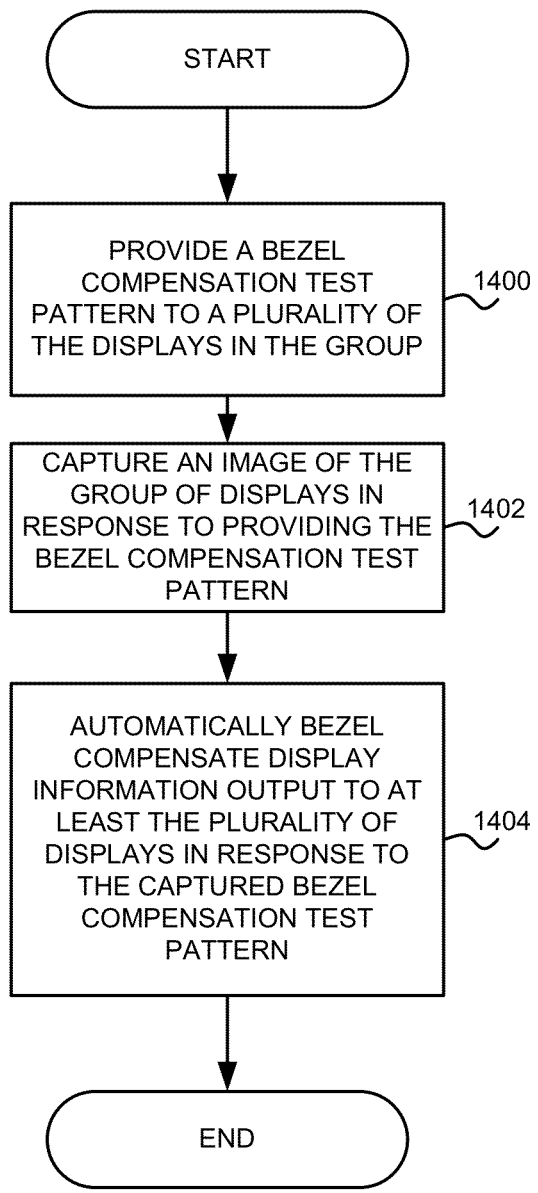
FIG. 14 is a flowchart illustrating one example of a method for bezel compensation set forth in the disclosure.

FIG. 13 diagrammatically illustrates an example of a bezel correction configuration operation in accordance with one example the disclosure. For one example, it will be assumed that the SLS display grid is fully filled and that the displays are configured to have comparable screen pixel geometries. The size of the displays may be any suitable size and in this example the displays are configured to have the same size and display resolution. The displays on the exterior perimeter of the grid have outside edges of their screens in alignment. For purposes of illustration, in this example, the displays also have the same (0 degree) orientation (not rotated), have no mirroring (x, y, or both), are flat (not curved surfaces), are coplanar (all monitors are in the same plane, aka at about the same distance from the camera), at close to "normal" (as in normal vector) to the camera (camera is not way off at an angle to one side or above or below the front of the centre monitor), and are rectilinear (not round monitors, etc . . . ). However any suitable arrangement may be employed. The camera could be used to detect and correct for differing orientations and other display related differences if desired. Referring also to FIG. 14, the system provides the bezel compensation test pattern to a plurality of the displays in the group such as display (0,0) having angled lines along two sides and display (0,1) having a corresponding bezel alignment image with neighboring display (0,0) shown as test pattern 1300 and 1302 This operation is shown in block 1400 in FIG. 14. The large outside rectangle 1304 is the outer dimension of the display grid and the bezel correction lines are displayed on all displays at the same time.

The smaller rectangles 1306 inside the surface represent the screen areas of each display that make up the SLS configuration. They are numbered according to their SLS grid location (Row X, Col. Y). Numbering for rows and columns increases top to bottom and left to right.

The gaps inside the SLS surface, between the display screens represent the area accounted for by the bezel correction. This accounts for the bezel area of each display (minus the displays bezel area edging the outside of the SLS frame plus whatever physical gaps exist between the display devices. The dotted arrow represents the order in which SLS displays are being bezel configured: a clock wise inward going spiraling track starting from the top left corner display and going through all of the displays in the SLS grid.

The spiral order is altered to first configure the displays adjacent to the top left one: (1,0) and (0,1). This helps configuring identical displays in the grid, where the first time a horizontal or a vertical gap is configured, the respective value is applied to all of their gaps. When each one of the existing gaps is configured then all of the display patterns are displayed and the user is asked if the patterns are acceptable. If so, the process is done. Otherwise the process continues "one gap at a time" with the remaining (unconfigured) displays. The dashed lines represent the bezel configuration test patterns used during the bezel configuration process. The purpose of the bezel configuration process is to determine the dimensions for all of the gaps, such that an image displayed across the display grid appears continuously behind the displays bezels.

As shown in block 1402 a method of bezel compensation includes capturing an image of the group of displays in response to providing the bezel compensation test pattern. As shown in block 1404 the method includes automatically bezel compensating display information by hiding display information behind the bezels, in response to the captured bezel compensation test image.

The disclosed operation is scalable to handle increasing sizes of display grids and can be applied to graphics hardware with little or no modification. No special equipment is required and can be implemented using smart phone, tablet platform or other devices that employ an image capture unit, such as camera. The method and apparatus provides a user-friendly low complexity configuration process that can increase the accuracy and speed up the configuration process by improving user arrangement decisions, allowing use of conventional display devices and provide bezel compensation, if desired, as well.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for providing for an arrangement of a group of displays comprising:
   providing at least a portion of a test pattern to a plurality of the displays in the group;
   capturing an image of the group of displays using a device in response to providing at least a portion of the test pattern; and
   automatically adjusting the group of displays by at least one of compensating display information output to at least the plurality of displays in response to the captured test image and compensating a logical arrangement of the group of displays by logically remapping at least one of the displays.

2. The method of claim 1 wherein providing a test pattern comprises:
   providing a bezel compensation test pattern to a plurality of the displays in the group;
   wherein capturing comprises capturing an image of the group of displays using the image capture unit in response to providing the bezel compensation test image; and
   wherein compensating display information output to at least the plurality of displays comprises automatically bezel compensating display information output to at least the plurality of displays in response to the captured bezel compensation test image.

3. The method of claim 2 comprising providing the bezel compensation test pattern to a subset of the group of displays, capturing the image of the group of displays, automatically bezel compensating display information to be output to the subset of displays, and repeating the process with other subsets in the group until bezel compensation is completed for the entire group of displays.

4. The method of claim 1 comprising determining whether to logically remap the at least one display based on the captured image of the group of displays with the provided test pattern for the at least one display and based on expected test pattern information.

5. The method of claim 1 wherein providing the test pattern for at least one of the displays in the group of displays comprises sequentially providing a test pattern on each display of the group of displays and wherein capturing the image of the group of displays using the image capture unit in response to providing the test pattern includes capturing the image of the group of displays for each sequentially provided test pattern.

6. The method of claim 1 comprising providing a user interface for adjusting the capturing accuracy of the entire group of displays and displaying one or more frames of images on the group of displays after logically remapping the at least one display.

7. The method of claim 1 comprising:
   capturing, by the image capture unit, an image of the group of displays;
   determining, by control logic, a total dimension of a display grid formed by the group of monitors based on the captured image of the group of displays;
   requesting, by control logic, expected test pattern information from another device that provides the test pattern;
   comparing, by control logic, the expected test pattern information to the captured test image of the group of displays;
   determining, by control logic, whether a logical remapping of at least one of the displays is required based on the comparing; and
   notifying the other device that a logical remapping is required.

8. The method of claim 1 comprising notifying a device that output the test pattern on the group of displays that a logical remapping of image output is required.

9. The method of claim 1 comprising displaying one or more frames of images on the group of displays after logically remapping the at least one display or after providing bezel compensation for at least one of the displays.

10. The method of claim 1 comprising:
    wirelessly receiving from an external image capture device a display test pattern request to display at least a portion of the test pattern on at least one of the displays in the group;
    providing at least a portion of the display test pattern to at least one of the plurality of displays in response to the wirelessly received display test pattern request;
    wirelessly receiving from an external image capture device remapping information based on the provided at least portion of the test pattern; and
    logically remapping a position of the at least one display in the group of displays, by the computing device, using the wirelessly received remapping information.

11. An apparatus for configuring a position arrangement of each display in a group of displays comprising:
    a display grid controller operative to provide a test pattern for at least one of the displays in the group of displays;
    a display grid configuration controller in operative communication with the display grid controller, operative to receive a captured of an image of the group of displays; and
    the display grid controller is also operative to at least one of logically remap the at least one display if the captured test image of the group of displays is determined to indicate a disparity in position arrangement based on the test pattern and to automatically bezel compensate display information output to at least the plurality of displays in response to the captured test image.

12. The apparatus of claim 11 wherein the display grid controller is operative to provide a bezel compensation test pattern to the plurality of the displays in the group; and wherein the display grid configuration controller is operative to capture an image of the group of displays in response to a providing of the bezel compensation test pattern by the display grid controller.

13. The apparatus of claim 11 wherein the display grid configuration controller is operative to determine whether to logically remap the at least one display based on the captured image of the group of displays with the provided test pattern for the at least one display and based on an expected test pattern information.

14. The apparatus of claim 11 wherein the display grid controller is operative to provide the test pattern for at least one of the displays in the group of displays by sequentially providing a test pattern on each display of the group of displays and wherein the display grid configuration controller controls capturing of the image of the group of displays using an image capture unit in response to providing the test pattern by controlling capturing of the image of the group of displays for each sequentially provided test pattern.

15. The apparatus of claim 11 wherein the display grid configuration controller is operative to provide a user interface for adjusting the capturing accuracy of the entire group of displays.

16. The apparatus of claim 11 wherein the control logic is operative to notify a device that output the test pattern on the group of displays that a logical remapping of image output is required.

17. The apparatus of claim 11 comprising:
   a wireless transceiver operatively configured to wirelessly receive from an external image capture device the display test pattern request to display the test pattern on at least one of the displays in the group;
   wherein the control logic is operative to provide the display test pattern to at least one of the plurality of displays in response to the wirelessly received display test pattern request;
   the wireless transceiver operatively configured to wirelessly receive from the external image capture device, the remapping data based on the provided test pattern; and
   the control logic operative to logically remap a position of the at least one display in the group of displays using the wirelessly received remapping data and operative to display one or more frames of images on the group of displays after logically remapping the at least one display.

18. A non-transitory storage medium that comprises executable instructions that when executed by one or more processors, causes the one or more processors to:
   control capturing of at least a portion of a test image displayed by the group of displays;
   compare expected test pattern information to the captured at least portion of the test image of the group of displays; and
   determine whether at least one of a logical remapping of at least one of the displays is required based on the comparing the expected test pattern information to the captured test image of the group of displays and automatically bezel compensating display information output to at least the plurality of displays in response to the captured at least portion of the test image.

* * * * *